United States Patent
Fan et al.

(10) Patent No.: US 9,977,918 B2
(45) Date of Patent: May 22, 2018

(54) METHOD AND SYSTEM FOR VERIFIABLE SEARCHABLE SYMMETRIC ENCRYPTION

(71) Applicant: Robert Bosch GmbH, Stuttgart (DE)

(72) Inventors: Xinxin Fan, Pittsburgh, PA (US); Boyang Wang, Tucson, AZ (US)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 15/274,344

(22) Filed: Sep. 23, 2016

(65) Prior Publication Data

US 2017/0300713 A1   Oct. 19, 2017

Related U.S. Application Data

(60) Provisional application No. 62/234,718, filed on Sep. 30, 2015.

(51) Int. Cl.
*H04L 29/06* (2006.01)
*G06F 21/62* (2013.01)
(Continued)

(52) U.S. Cl.
CPC ........ *G06F 21/6227* (2013.01); *H04L 9/0618* (2013.01); *H04L 9/3242* (2013.01);
(Continued)

(58) Field of Classification Search
CPC ......... G06F 21/6227; G06F 2221/2107; H04L 63/0876; H04L 9/3242; H04L 9/0618; H04L 63/0435
See application file for complete search history.

(56) References Cited

U.S. PATENT DOCUMENTS 7,315,866 B2 *   1/2008   Wu .......................... G06F 21/64
7,552,327 B2 *   6/2009   Halcrow ................. G06F 21/46
                                                           713/165

(Continued)

FOREIGN PATENT DOCUMENTS

EP        2871801 A1    5/2015

OTHER PUBLICATIONS

Benaloh, Josh et al., "One-Way Accumulators: A Decentralized Alternative to Digital Signatures", In Proc. of EUROCRYP'93, 1993 (12 pages).

(Continued)

*Primary Examiner* — Mohammed Waliullah
(74) *Attorney, Agent, or Firm* — Maginot Moore & Beck LLP

(57) ABSTRACT

A method for verification of search results in an encrypted search process includes transmitting a search query including the encrypted keyword from a client to a server, and receiving a response to the search query and a first plurality of hash values from at least one hash tree from the server. The method further includes generating, a first message authentication code (MAC) based on the response, generating a first regenerated root node hash value using the first MAC, the first plurality of hash values, and a predetermined hash function, and generating an output message with the client indicating that the response is invalid in response to the first regenerated root node hash value not matching a predetermined first root node hash value stored in the memory of the client.

18 Claims, 5 Drawing Sheets

(51) Int. Cl.
*H04L 9/06* (2006.01)
*H04L 9/32* (2006.01)

(52) U.S. Cl.
CPC ...... *H04L 63/0435* (2013.01); *H04L 63/0876* (2013.01); *G06F 2221/2107* (2013.01)

(56) References Cited

U.S. PATENT DOCUMENTS

| | | | |
|---|---|---|---|
| 8,595,504 B2 | 11/2013 | Huang et al. | |
| 9,565,172 B2* | 2/2017 | Stahl | G06F 21/33 |
| 2009/0012957 A1* | 1/2009 | Villaret | G06F 7/02 |
| 2010/0042842 A1* | 2/2010 | Huang | H04L 9/3236 |
| | | | 713/176 |
| 2011/0029780 A1* | 2/2011 | Pinkas | G06Q 20/3829 |
| | | | 713/181 |
| 2014/0245020 A1 | 8/2014 | Buldas et al. | |

OTHER PUBLICATIONS

Bloom, Burtin H., "Space/Time Trade-offs in Hash Coding with Allowable Errors", Communications of the ACM, vol. 13, No. 7, Jul. 1970 (5 pages).

Garg, Sanjam. et al., "Candidate Indistinguishability Obfuscation and Functional Encryption for all circuits", In Proc. of FOCS'13, 2013 (46 pages).

Goh, Eu-Jin, "Secure Indexes", retrieved from https://eprint.iacr.org/2003/216.pdf (18 pages).

Katz, Jonathan et al., "Aggregate Message Authentication Codes", In Proc. of CT-RSA'08, 2008 (13 pages).

Merkle, Ralph C., "A Digital Signature Based on a Conventional Encryption Function", In Proc. of CRYPTO'87, 1987 (10 pages).

Nguyen, Lan, "Accumulators from Bilinear Pairings and Applications", In Proc. of CT-RSA'05, 2005 (18 pages).

Cash, David et al, "Dynamic Searchable Encryption in Very-Large Databases: Data Structures and Implementation", In Proc. of NDSS'14, 2014 (16 pages).

Cash, David et al., "Highly-Scalable Searchable Symmetric Encryption with Support for Boolean Queries", In Proc. of CRYPTO'13, 2013 (45 pages).

Curtmola, Reza et al., "Searchable Symmetric Encryption: Improved Definitions and Efficient Constructions", pp. 1-33 (33 pages).

Kamara, Seny et al., "Parallel and Dynamic Searchable Symmetric Encryption", In Proc. of FC, 2013 (15 pages).

Kamara, Seny et al., "Dynamic Searchable Symmetric Encryption", In Proc. of ACM CCS'12 (24 pages).

Song, Dawn et al., "Practical Techniques for Searches on Encrypted Data", In Proc. of IEEE S&P'00, 2000 (12 pages).

Sun, Wenhai et al., "Catch You if You Lie to Me: Efficient Verifiable Conjunctive Keyword Search over Large Dynamic Encrypted Could Data", 2015 IEEE Conference on Computer Communications (INFOCOM), pp. 2110-2118 (9 pages).

Kurosawa, Kaoru et al., "How to Update Documents Verifiably in Searchable Symmetric Encryption", M. Abdalla, C. Nita-Rotaru, and R. Dahab (Eds.): CANS 2013, LNCS 8257, pp. 309-328 (20 pages).

Kurosawa, Kaoru et al., "UC-Secure Searchable Symmetric Encryption", A.D. Keromytis (Ed.): FC 2012, LNCS 7397, pp. 285-298 (14 pages).

Cheng, Rong et al., "Verifiable Searchable Symmetric Encryption from Indistinguishability Obfuscation", ASIACCS'15, 2015, pp. 621-626 (6 pages).

\* cited by examiner

METHOD AND SYSTEM FOR VERIFIABLE SEARCHABLE SYMMETRIC ENCRYPTION

CLAIM OF PRIORITY

This application claims priority to U.S. Provisional Application No. 62/234,718, which is entitled "Method and System for Verifiable Searchable Symmetric Encryption," and was filed on Sep. 30, 2015, the entire contents of which are hereby expressly incorporated by reference herein.

FIELD

This disclosure relates generally to the fields of information security, and, more particularly, to systems and methods that verify the correctness and completeness of search results produced by an untrusted server computing device that searches encrypted data.

BACKGROUND

Methods for performing searches of encrypted data that do not compromise the confidentiality of the encrypted data are known to the art. For example, in one common configuration a server computing device stores a large number of encrypted data files with an associated encrypted search index. One or more client computing devices make search requests to the server using encrypted representations of search keyword terms. Symmetric Searchable Encryption (SSE) is one method for performing searches in an encrypted search index that enables a client computing device that has access to a symmetric cryptographic key to perform searches for specific terms in the encrypted search index that is stored on the server. The server, however, only receives the encrypted search terms and cannot identify the content of the search terms based on the communications that are received from the client because the server does not have access to the (secret) cryptographic key required to decrypt the search terms.

Existing searchable encryption systems enable a client to search for a specific term or "keyword" in an encrypted search index. However, the existing searchable encryption systems have difficulty in ensuring that the results returned from the server are actually valid. For example, even though an untrusted server cannot identify the contents of an encrypted search keyword or the contents of encrypted files, a server that has been compromised by an attacker may simply return false results to the client in response to a search. The results may be completely incorrect, which the client would likely identify after receiving one or more clearly erroneous search results. However, in a more subtle attack the server may return partially correct results to the client that may convince the client that the server is operating normally when the server has in fact been compromised. Consequently, improvements to methods and systems for performing searches in encrypted data that enable a client to verify that the search results returned from a server are both accurate and complete would be beneficial.

SUMMARY

In one embodiment, a method for performing validation of search results for encrypted data that are retrieved from an untrusted server computing device has been developed. The method includes generating, with a client computing device, an encrypted keyword based on a plaintext keyword using a first cryptographic key stored in a memory of the client computing device, transmitting, with the client computing device, a search query including the encrypted keyword to a server computing device through a data network, receiving, with the client computing device, a response to the search query and a first plurality of hash values from at least one hash tree from the server computing device through the data network, the first plurality of hash values corresponding to a plurality of nodes in the at least one hash tree corresponding to siblings of nodes in a path from a leaf node corresponding to the response to the query to a root node of the at least one hash tree, generating, with the client computing device, a first message authentication code (MAC) based on the response to the search query using a second cryptographic key stored in the memory of the client computing device, generating, with the client computing device, a first regenerated root node hash value using the first MAC, the first plurality of hash values, and a predetermined hash function, and generating, with an output device in the client computing device, an output message indicating that the response from the server computing device is invalid in response to the first regenerated root node hash value not matching a predetermined first root node hash value stored in the memory of the client computing device.

In another embodiment, a system that performs validation of search results for encrypted data that are retrieved from an untrusted server computing device has been developed. The system includes a network interface device configured to send and receive data through a data network, a memory, an output device, and a processor operatively connected to the network interface device, the memory, and the output device. The processor is configured to generate an encrypted keyword based on a plaintext keyword using a first cryptographic key stored in the memory, transmit a search query including the encrypted keyword to a server computing device through a data network using the network interface device, receive a response to the search query and a first plurality of hash values from at least one hash tree from the server computing device using the network interface device, the first plurality of hash values corresponding to a plurality of nodes in the at least one hash tree corresponding to siblings of nodes in a path from a leaf node corresponding to the response to the query to a root node of the at least one hash tree, generate a first message authentication code (MAC) based on the response to the search query using a second cryptographic key stored in the memory, generate a first regenerated root node hash value using the first MAC, the first plurality of hash values, and a predetermined hash function, and generate an output message with the output device indicating that the response from the server computing device is invalid in response to the first regenerated root node hash value not matching a predetermined first root node hash value stored in the memory of the client computing device.

DETAILED DESCRIPTION

Figure 1:
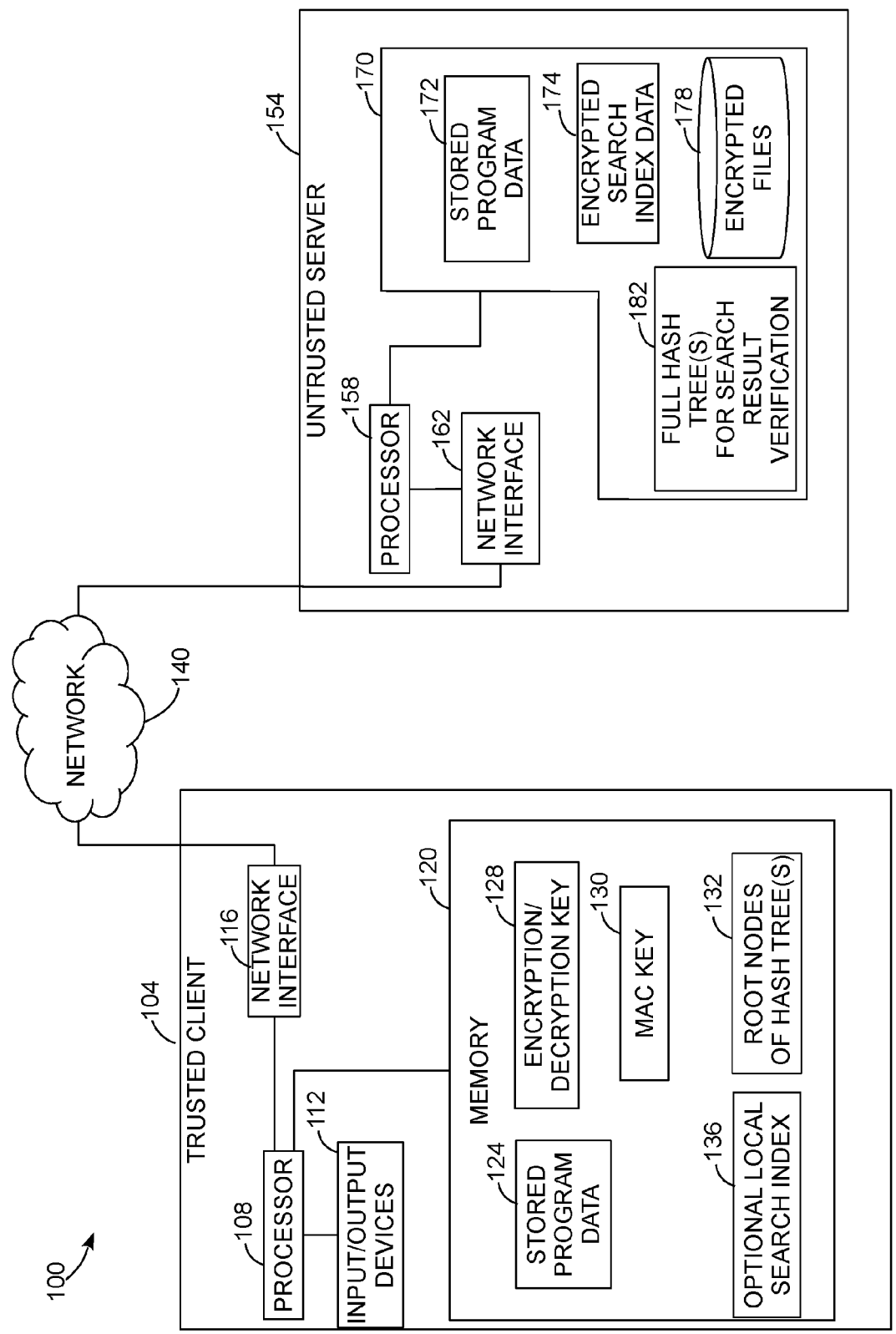
FIG. 1 is a schematic diagram of a system that implements symmetric searchable encryption (SSE) to enable a trusted client to verify the correctness and completeness of encrypted search results and encrypted data files that are stored in a memory device of an untrusted server.

For the purposes of promoting an understanding of the principles of the embodiments described herein, reference is now be made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

Definitions that pertain to the systems and methods described herein are set forth below. As used herein, the term "file" refers to any set of structured data that can be encrypted and stored in the memory of an untrusted server computing device. Examples of files include human or machine readable text and binary data, image data, video data, audio data, and other documents that are stored in a filesystem of a digital computing device. Additional examples of files include, for examples, individual rows or other subsets of tables that are stored within a relational database or other objects in a structured data store.

As used herein, the term "keyword" refers to a set of data corresponding to a value that is contained in one or more files. A search process identifies the keyword value in the files and an encrypted search process generates an encrypted version of the keyword that is suitable for use as a search key in an encrypted search index to prevent an untrusted computing device that performs the search from identifying the original plaintext keyword. A "plaintext" or "unencrypted" keyword refers to the value itself in a machine or human readable format while an encrypted keyword refers to a set of encrypted data that are generated using the value and a cryptographic key using a predetermined encryption process. As is described in more detail below, an untrusted server computing device that stores encrypted data receives a search query from a trusted client computing device including at least one encrypted keyword. The server computing device retrieves identifiers and encrypted contents for encrypted files that include the value corresponding to the encrypted keyword. However, the server computing device cannot determine the value of the original plaintext keyword based on the contents of the search query. A client computing device stores the cryptographic key and generates search queries for a server computing device including the encrypted keywords.

As used herein, the term "cryptographically secure hash" or more simply "hash" refers to a numeric output that is generated by a cryptographically secure hash function based on a set of input data. The numeric output is typically on the order of 224 to 512 bits in length depending upon the hash function used. Cryptographically secure hash functions have numerous properties that are known to the art. For purposes of this document, one feature of a cryptographically secure hash function is that given a certain output hash value, there is at most one known set of input data that can generate the hash value. For example, both a legitimate computing device and an attacker computing device are assumed to have access to a certain set of input data D (which may be encrypted) and can perform a predetermined hash function to generate a hash output $H_D$. However, the attacker cannot practically determine another set of forged input data D' that also produces the same hash output $H_D$. This property is also referred to as "collision resistance" and cryptographically secure hash functions include collision resistance along with stronger security properties such as preimage resistance that are known to the art. Examples of cryptographically secure hash functions include the secure hash algorithm (SHA) version 2 and version 3 families of hash functions.

As used herein, the term "message authentication code" (MAC) refers to a set of numeric data that are used to verify a set of data D using a secret cryptographic key. While the actual data output of a MAC and a cryptographically secure hash function are often similar in nature (e.g. a 256 bit set of output data for both a hash function and a MAC), the primary difference between the two is that while any computing device that implements a predetermined hash function can generate the hash value for a given set of input data, only computing devices that have access to a cryptographic key (referred to as $K_m$ herein) can generate the MAC for a certain piece of input data. An attacker cannot generate a forged piece of data D' that will reproduce the same MAC code for the original data D. Furthermore, the attacker cannot generate a different valid MAC for the forged data D' because the attacker does not have access to the secret $K_m$. MAC algorithms that are known to the art include hashed-MAC (HMAC) algorithms that incorporate a cryptographically secure hash function in a larger algorithm to generate the MAC (e.g. MAC=$H(K_m \| H(K_m \| D))$) where H is the cryptographically secure hash function, $K_m$ is the key, and D is the data for which the MAC is generated, although the SHA-3 algorithm is believed to be immune to length extension attacks and may simply be used as $H(K_m \| D)$). As described in more detail below, a trusted client computing device computes MACs for different sets of encrypted data and transmits the MACs, which are encoded into one or more hash trees, along with the encrypted data to an untrusted server. The client uses the MACs and the hash tree data to verify that the server provides accurate and complete responses to search queries in a searchable symmetric encryption (SSE) scheme.

As used here, the term "hash tree" refers to a data structure that includes a plurality of "leaf" nodes that are each assigned a parent node with one or more layers of subsequent parent nodes that lead to a single root node for the entire hash tree. Each parent node typically includes a predetermined number of child nodes (e.g. two child nodes in a binary tree) and each parent node contains the hashed values of a concatenation or other combination of the data stored in the child nodes. The root node includes a hashed value of the combination of the top-most layer of parent nodes and the value of the root node along with a selection of intermediate parent nodes is used to identify if a given MAC or hash value properly corresponds to a leaf node in the tree. A Merkle hash tree is one embodiment of a hash tree that is known to the art and that is used in this document for illustrative purposes. In this document, each leaf node contains a MAC (or a hash of a MAC) of a search index entry, one or more encrypted data files, or combination thereof as is described in more detail below. Each parent node in the tree contains another hashed value that corresponds to a combination of the values stored in the two child nodes.

As used herein, the terms referring to "validation" and "verification" are used interchangeably and refer to an operation by a trusted client computing device to ensure that responses to search queries and data files that are received from an untrusted server device are valid. "Valid" or "verified" as used in this document simply means that data a client retrieves from the server is in fact the same data that the client—or another trusted computing device sharing the same cryptographic keys as the client—generated for storage in the memory of the server device prior to sending search queries and file retrieval requests to the server. The verification process ensures that the server has not modified either search index data or the contents of files stored on the server in situations where an attacker has access to the server and may attempt to alter either or both of the search index used to find data files and the contents of the files themselves. While the client may not be able to prevent an attacker from compromising the server, the client can detect any attempts by the attacker to alter the file data or have the server deliver incorrect or incomplete results in response to a search query from the client. Additionally, the methods and systems described in this document also preserve the confidentiality of the data stored in encrypted files and an encrypted search index that is stored in the memory of the untrusted server.

FIG. 1 depicts one embodiment of a system 100 that includes a client computing device ("client") 104 and a server computing device ("server") 154. The client 104 is communicatively connected to the server 154 through a data network 140. The data network 140 is, for example, a local area network (LAN), a wide area network (WAN), or a combination of two or more LAN and WAN networks that enables bi-directional communication between the client 104 and server 154. In the system 100, the client computing device 104 is a "trusted" computing device meaning that the client 104 has access to cryptographic key data 128 and the MAC key data 130 that are described in more detail below. The cryptographic key data 128 includes one or more symmetric encryption/decryption keys that enable the client 104 to encrypt data including both files and search index data that are used to search for keywords within encrypted files and to decrypt any of the encrypted data. The MAC key data 130 includes at least one cryptographic key that the client 104 uses to generate and verify MAC values that the server 154 cannot forge. The server 154 is considered to be "untrusted" in that the server 154 does not have access to the cryptographic keys 128 and the server 154 should not gain access to the plaintext (unencrypted) data in either of an encrypted search index 174 or encrypted file data 178. During the search operations that are described herein, the server 154 receives search query messages that are from the client 104 included encrypted keywords and transmits encrypted search results and optionally encrypted data files to the client 104 through the network 140. However, the search operations prevent the server 154 from identifying the plaintext contents of either the search keywords used in the secure search process or the plaintext contents of any of the encrypted data files.

The client computing device 104 is a digital computing device that includes a processor 108, one or more input/output (I/O) devices 112, a network interface device 116, and a memory 120. The processor 108 is a digital logic device that includes, for example, one or more central processing unit (CPU) cores, graphical processing unit (GPU) cores, digital signal processing (DSP) units, and the like. In some embodiments the processor 108 includes multiple discrete processing devices, such as separate CPU and GPU components, while in other embodiments the processing devices are integrated into a single digital logic device in a System on a Chip (SoC) configuration. The I/O devices 112 include, for example, keyboards, mice, touch input devices, speech input devices, and audio/video output devices that enable a user to enter commands to control the client 104 and receive output information from the client 104. In particular, the client 104 performs searches in the encrypted data files that are stored in the server 154 and the I/O devices 112 enable a user to request searches for files that include a keyword. The network interface device 116 is, for example, a wired or wireless network adapter that communicatively couples the client 104 to the server 154 through the data network 140.

The memory 120 includes one or more data storage devices including non-volatile data storage devices such as magnetic, optical, or solid-state drives and volatile data storage devices such as static and dynamic random access memory (RAM). In the configuration of FIG. 1, the memory 120 holds stored program instruction data 124, cryptographic key data 128, message authentication code (MAC) key data 130, the root node hash data 132 for at least one hash tree that is used to verify responses to encrypted search queries and file retrieval requests from the server 154, and a local search index 136 that stores a record of each keyword that is present in at least one of the encrypted files 178 that are stored in the server 154. The stored program data 124 includes one or more software programs that enable the client 104 to perform the operations described herein including, but not limited to, encrypting and decrypting file, keyword, and search index data, generating search indices, generating search queries for encrypted keywords, verifying the accuracy and completeness of the responses received from the server 154, and decrypting search results and encrypted files that are received from the server 154.

The cryptographic keys 128 include at least one set of secret data with a predetermined key size (e.g. 128 bits or 256 bits) that is known only to the client 104 and not to the server 154 or other third parties. The MAC key 130 is another symmetric key with the predetermined key size that is known only to the client 104 and not to the server 154 or other third parties. The processor 108 generates the cryptographic key 128 and the MAC key 130 using a secure key generation process that is otherwise known to the art and not described in further detail herein. While illustrative embodiment of the client 104 depicts the cryptographic encryption/decryption key 128 and the MAC key 130 as separate keys, in another embodiment the client 104 uses a single cryptographic key that remains secret from the server 154 and third parties as both the encryption/decryption key and a key that the processor 108 uses to generate MACs. Furthermore, in some embodiments the client 104 employs multiple encryption/decryption keys and/or multiple MAC keys for different sets of data, such as multiple file stores, in a manner that is compatible with the verification processes described herein. The client 104 uses a symmetric encryption and decryption scheme that is otherwise known to the art for secure encryption and decryption of data, such as the advanced encryption system (AES), to encrypt and decrypt data including search keywords, search index data, and file data.

The local search index 136 is, for example, a binary search tree that stores a record of all values that correspond to keywords that are stored in at least one of the encrypted files 178 that are stored in the server 154. The client 104 stores the local search index 136 in the client memory 120 to enable identification of keyword values that are also present in at least one of the encrypted files 178 that are stored in the memory 170 of the server 154. In the embodiment of the system 100, the local search index 136 enables the client 104 to identify keyword values that are verified to be included in a search entry of the encrypted search index 174 and at least one encrypted file 178 stored in the memory 170 of the server 154. The client 104 uses the local search index 136 to ensure that any search query that is transmitted to the server 154 should return a non-null result with matching files, which prevents the server 154 from generating a false response to the search query in which the server 154 indicates there are no files that match the search query for the encrypted keyword.

The server computing device 154 is a digital computing device that includes a processor 158, a network interface device 162, and a memory 170. The processor 158, network interface device 162, and memory 170 are structurally similar to the processor 108, network interface 116, and memory 120 of the client 104, respectively, although in some embodiments the server 154 includes more computational and storage capacity than the client 104 to enable a single server 154 to provide services to a large number of clients that are each configured in the same manner as the client 104 in FIG. 1.

In the server 154, the memory 170 holds stored program instructions 172, encrypted search index data 174, the encrypted file data 178, and at least one full hash tree 182. In the system 100, the client 104 generates the encrypted search index data 174, encrypted files data 178, and the full hash tree data 182 prior to transmitting these data to the server 154 for storage in the memory 170, and during operation of the system 100 the server 154 generates responses to encrypted search queries from the client 104 that the client 104 verifies to ensure the server 154 returns accurate and complete responses to search queries from the client 104. The server 154 executes the stored program data 172 to implement the operations described herein including, but not necessarily limited to, processing search queries received from the client 104 to return encrypted search results from the encrypted search index 174, processing file requests from the client 104 to transmit selected encrypted file data 178 to the client 104, and storing encrypted search index and encrypted file data that are received from the client 104.

Figure 2:
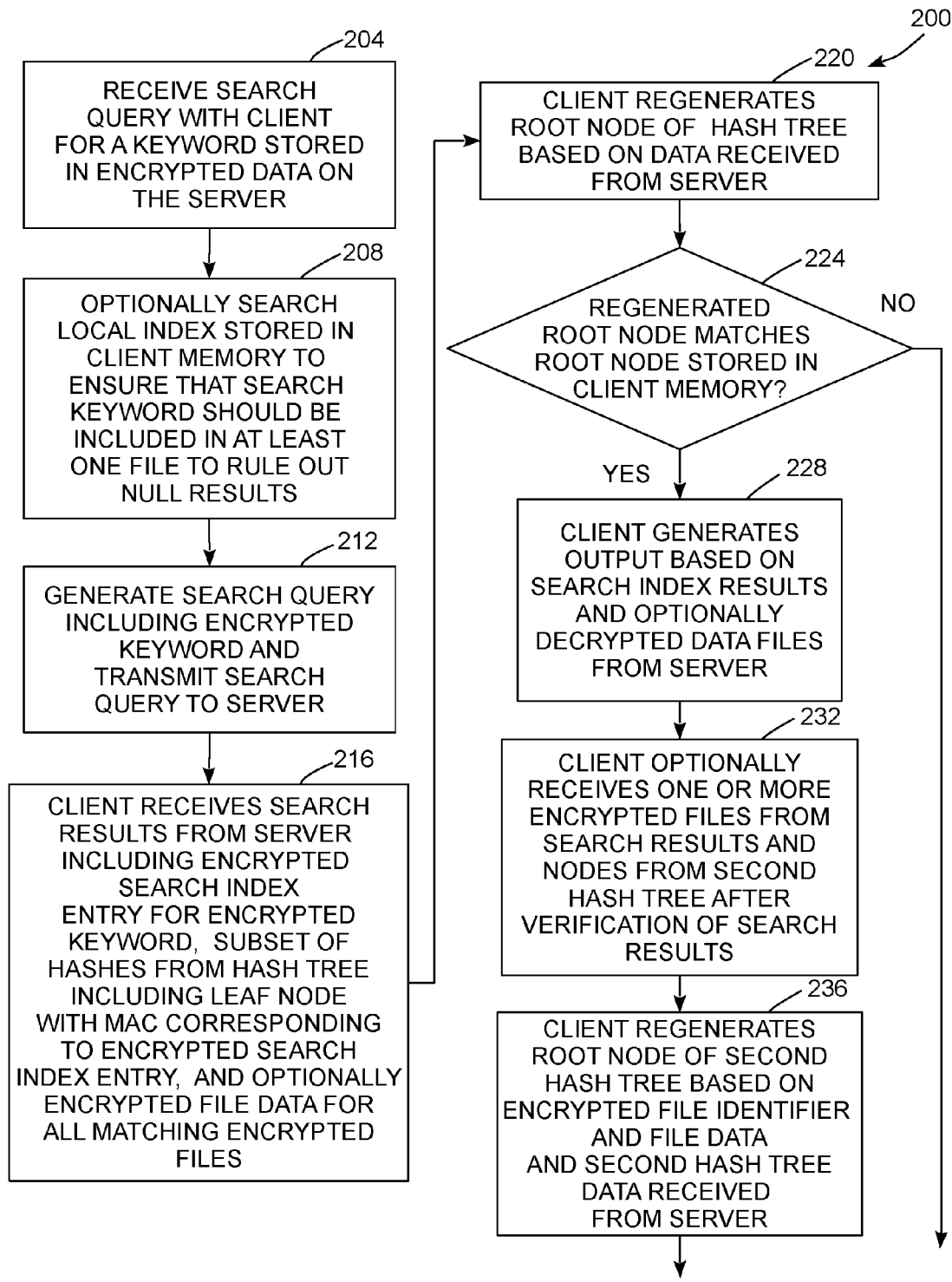
FIG. 2 is a block diagram of a process for performing a keyword search in encrypted data on the untrusted server and for verifying the correctness and completeness of encrypted search results and encrypted data files that the server transmits to the client.
Figure 2:
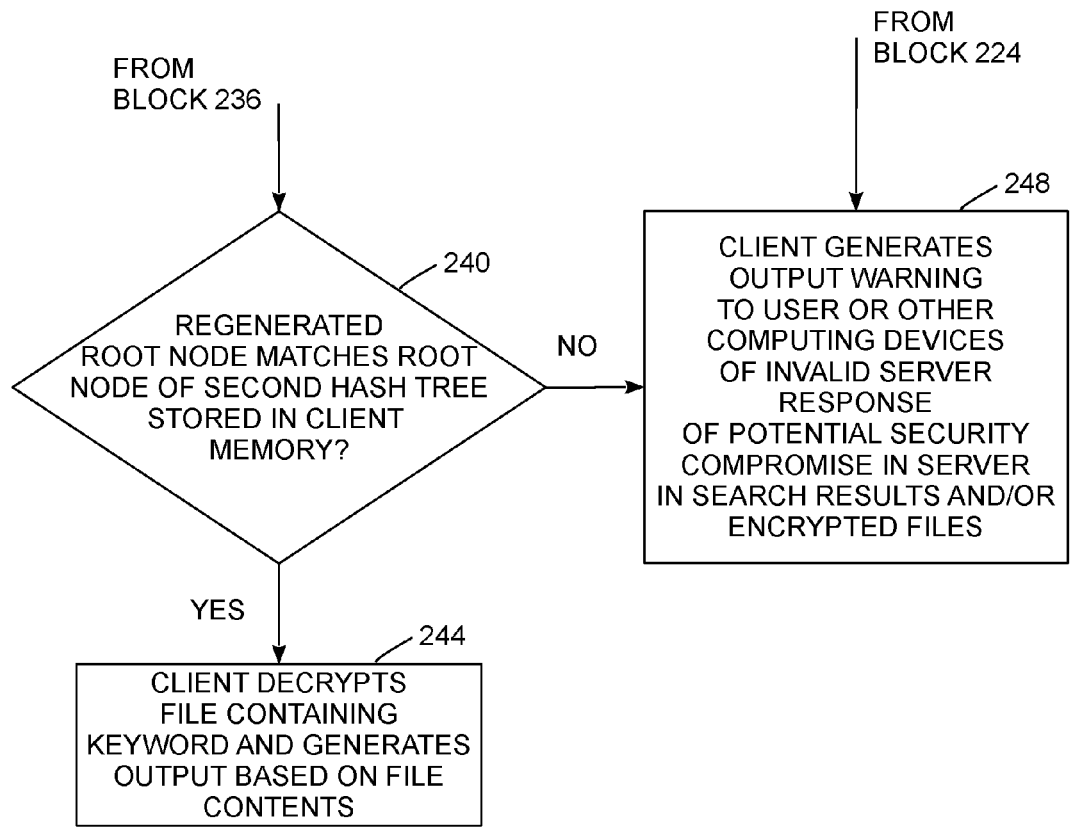

FIG. 2 depicts a process 200 for performing a search operation for a keyword value in a set of encrypted data stored on an untrusted server. The search operation includes a verification process to ensure that the untrusted server returns valid and complete search results and optionally encrypted file data. In the description below, a reference to the process 200 performing an action or function refers to the operation of a processor to execute stored program instructions to implement the action or function in association with other components in a computerized device or network. The process 200 is described in conjunction with the system 100 of FIG. 1 for illustrative purposes.

Some portions of the process 200 are applicable to a single hash tree embodiment or a double hash tree embodiment that are described in more detail below. In brief, a single hash tree embodiment employs a single hash tree that the client 104 generates and transmits to the server 154 to verify the accuracy and completeness of both the search results for the encrypted keyword search from the server 154 and the contents of the encrypted files that are identified in the search results. The double hash tree embodiment uses a first hash tree to verify the accuracy and completeness of the search results for an encrypted keyword search and a second hash tree to verify the encrypted contents of each file that the client 104 retrieves from the server 154 based on the search results. The single hash tree embodiment enables the server 154 to store a single and comparatively compact hash tree in the server memory 170 that the system 100 uses to verify both the search results and the contents of encrypted files. The double hash tree embodiment requires that the server 154 store a larger set of hash tree data in two hash trees with the first hash tree handling verification of the search results in the encrypted search index 174 and the second hash tree handling verification of the contents of the encrypted files 178. The double hash tree embodiment enables the client 104 to authenticate the search results that are received from the server 154 without having to retrieve and verify the contents of the encrypted data files that are identified in the search results. During the process 200, the client 104 in the system 100 has already generated and transmitted to the server 154 an encrypted search index, encrypted file data, and the at least single hash tree. The client 104 has also generated a local search index in embodiments that use the local search index. The generation of the single or double hash trees along with the encrypted search index and encrypted file data is described in more detail in the process 300 of FIG. 3.

Process 200 begins as the client 104 receives a search query for a keyword (block 204). The client 104 receives the query via, for example, one of the input devices 112 from a user or as part of execution of a software program in the client 104 that generates a search query. As described above, search query keywords include human readable text and numeric keywords as well as keywords that correspond to specific sets of machine readable data that are stored within one or more files.

During process 200 the client 104 optionally checks if the keyword in the search request is included in the local search index 136 that is stored in the memory 120 prior to generating the search query including the encrypted keyword for the server 154 (block 208). The processor 108 performs a search for the keyword in the local search index 136 to ensure that the server 154 should return a non-trivial search result because the client 104 has ensured that the search keyword should be included in search index data 174 and in at least one of the encrypted files 178. As described above, the local search index 136 is a hash table, search tree, or any other suitable data structure that stores the keywords in a structure that enables the processor 108 to search for the presence or absence of the keywords. The local search index 136 is a much smaller data structure than the plaintext or encrypted search index data 174 because the local search index 136 only stores a record of the keywords that are present in any of the encrypted files 178 and does not actually indicate the specific files that match each keyword. Consequently, the local search index 136 consumes a much smaller amount of space in the memory 120 than the full search index and is stored in the memory 120 of the client 104 in many embodiments. If the processor 108 does not find the keyword in the search in the local search index 136, then the process 200 ends with the client 104 generating an output with the output device 112 to indicate that the keyword is not present in any of the encrypted files 178. In embodiments of the process 200 that use the local search index 136, the client 104 can identify that any null result from the server that indicates a search term does not match any files as being an incorrect search result because the client 104 only transmits queries for keywords that are included in the encrypted search index 174 to the server 154.

The process 200 continues as the client 104 generates a search query including an encrypted version of the keyword and transmits the search query to the server 154 through the data network 140 (block 212). In the client 104, the processor 108 uses the symmetric cryptographic key 128 (key $K_e$) to encrypt the plaintext keyword in the query. The processor 108 then transmits the search query including only the encrypted keyword to the server 154 using the network interface device 116.

The process 200 continues as the client 154 receives a response to the search query from the server 154 including an encrypted entry from the encrypted search index 174 that corresponds to the encrypted keyword, a subset of hash values from at least single hash tree, and optionally the encrypted files that match the search results (block 216). During process 200, the server 154 receives the encrypted keyword in the search query with the network interface device 162 and the processor 158 identifies an entry in the encrypted search index 174 that corresponds to the encrypted keyword. The encrypted search index 174 is, for example, a hash table, search tree, or other suitable data structure that enables the processor 158 to retrieve an encrypted set of data corresponding to the encrypted keyword that is contained in the search query. In the client 104, the processor 108 decrypts the search entry data using the cryptographic key 128 to generate a plaintext search index entry. The plaintext search index entry further includes one or more encrypted file identifiers that identify the encrypted files containing the keyword in the search query. In the embodiment of the process 200 that is presented herein, the search index entries remain encrypted while stored in the memory 170 of the server 154 to prevent the server 154 from identifying the association between an encrypted keyword and the encrypted data files 178 that include the keyword until the client 104 performs at least one search for the given keyword. Even though the server 154 only receives encrypted keywords in searches, the system 100 minimizes the amount of information that the client 104 provides to the server 154 to reduce the effectiveness of statistical traffic analysis techniques that monitor the patterns of searches even if the specific search keywords and file contents remain encrypted. The system 100 uses a search index structure and search technique that is otherwise known to the art for symmetric searchable encryption to perform the search without revealing the contents of the encrypted keyword or the contents of the encrypted files to the server 154.

In the single hash tree embodiment, the client 104 receives the search results from the server 154 and as part of the verification process the client 104 also receives copies of all the encrypted files that are identified in the search index entry for the keyword. In the embodiment of the system 100, each search entry in the encrypted search index 174 is encrypted, meaning that the processor 158 in the server 154 cannot directly identify the encrypted files 178 that correspond to the entry in the search index. To receive the contents of the encrypted files 178 that match the entry in the search index, the server 154 transmits the encrypted search index entry to the client 104, the processor 108 in the client 104 decrypts the search index entry using the symmetric cryptographic key 128 ($K_e$), and the client 104 subsequently transmits file transfer requests for each of the encrypted file identifiers that are contained in the search entry to the server 154. The server 154 transmits the encrypted files to the client 104, and the client 104 verifies the correctness of the encrypted search index entry and all of the encrypted files using the hash tree data received from the server 154 and the root node $\theta$ of the hash tree that the client 104 stores with the root node data 132.

The server 154 identifies hash nodes that are contained in the single hash tree or in a hash tree that corresponds to the contents of the encrypted search index 174 based on the search query from the client 104. The processor 158 in the server 154 identifies a leaf node in the hash tree that matches the encrypted search keyword from the client 104, although the leaf node itself also includes a MAC (or hash of a MAC) that was previously generated by the client based on the identifiers of the files that contain the keyword, and the encrypted keyword. The server 154 does not typically transmit the leaf node itself back to the client 104 because during process 200 the client re-generates the MAC (or hash of the MAC) in the leaf node itself. Instead, the server 154 identifies neighboring nodes of the identified leaf node starting at the leaf-level of the tree and continuing up to the root node of the tree. Using the hash tree 400 of FIG. 4 as an example, the processor 158 in the server 154 identifies the leaf node 424 that contains the hash data 432 (single hash tree embodiment) or the search index hash tree data 436 in a first hash tree (double hash tree embodiment). The processor 158 identifies neighboring nodes 428, 416, and 412 at different levels of the hash tree 400 and transmits the hash contents of these nodes along with identifiers that enable the client 104 to identify the level of each node in the tree to the client 104. In the tree 400, the server 154 does not need to transmit the intermediate nodes 420 and 408 or transmit the root node 404 to the client 104 because the client 104 re-generates the MAC values and corresponding hash values for these nodes during the process 200.

In the double hash tree embodiment, the client 104 receives the search results from the server 154 along with the hash tree nodes from the hash tree data 182 that corresponds to the encrypted search index 174. The processor 108 in the client 104 decrypts the encrypted search entry data using the cryptographic key 128 in the same manner as for the single hash tree embodiment. The client 104 does not receive the encrypted files that are identified in the search index entry directly. As is described in more detail below, in the double hash tree embodiment the client 104 optionally retrieves the encrypted files individually and verifies the contents of the encrypted files separately from verification of the contents of search index that the server 154 transmits to the client 104.

The process 200 continues as the client 104 regenerates the root node of the hash tree based on the response data that are received from the server 154 (block 220). In the single hash tree embodiment, the processor 108 generates an aggregate MAC $\sigma$ for the response based on the following individual MAC values:

$$\alpha = \mathrm{MAC}(\overline{\mathrm{Keyword}} \| \overline{F_1} \| \overline{F_2} \| \ldots \| \overline{F_N}) \qquad \text{a.}$$

$$\beta_1 = \mathrm{MAC}(\overline{F_1} \| \overline{c_1}); \beta_2 = \mathrm{MAC}(\overline{F_2} \| \overline{c_2}); \ldots \beta_N = \mathrm{MAC}(\overline{F_N} \| \overline{c_N}) \qquad \text{b.}$$

$$\sigma = \alpha \oplus \beta_1 \oplus \beta_2 \ldots \oplus \beta_N \qquad \text{c.}$$

Where $\overline{\mathrm{Keyword}}$ is the encrypted keyword used in the search query, each term $\overline{F_n}$ is the encrypted identifier of each file that matches the keyword in the encrypted search index, and $\overline{c_n}$ is the encrypted contents of the file corresponding to the encrypted identifier $\overline{F_n}$. The encrypted file identifier is, for example, an encrypted file name that corresponds to one of the encrypted files 178 stored in the memory 170 of the server 154 or an index value that corresponds to the location of the encrypted data in a database or other structured data store. Each search entry includes at least one identifier for a file $\overline{F_n}$ and the corresponding encrypted file contents $\overline{c_n}$. In the single hash tree embodiment, the processor 108 uses the aggregate MAC $\sigma$, the nodes returned from the single hash tree 182 from the server 154, and the root node data 132 stored in the client memory 132 to determine the validity of both the search results that the server 154 transmits to the client 104 and the contents of the encrypted files $c_n$. In the double hash tree embodiment, the client 104 only uses the MAC α along with the nodes from the first hash tree data 182 and the root node data 132 for the first hash tree to determine the validity of search results that are returned from the server 154. The client 104 uses the individual MAC values $β_n$ to determine the validity of the contents of individual files that the server 154 returns to the client 104 based on validation with nodes that the server 154 retrieves from the second hash tree data 182 and the root node of the second hash tree 136 stored in the client memory 120. In both the single and double hash tree embodiments, the client 104 uses the MAC key 130 ($K_m$) to generate each of the MAC values using the predetermined MAC function.

After the client 104 generates either the aggregate MAC σ or the search index result MAC α based on the search result data returned from the server 154, the processor 108 in the client reconstructs a root node of a hash tree based on the generated MAC, which corresponds to a leaf node in the hash tree, and the hash values for sibling and parent nodes that the server 154 transmitted to the client 104 with the response data. The sibling and parent nodes form a path of hash values from the leaf node in the hash tree, which the client processor 108 regenerates using the MAC value and the hash function, to the parent node of the hash tree. The client processor regenerates some of the hash tree nodes in the path from the leaf node to the root using the additional sibling hash values at different levels of the hash tree that are received from the server as inputs to regenerate the hash values in the nodes that lead up to the root node of the entire hash tree.

Figure 4:
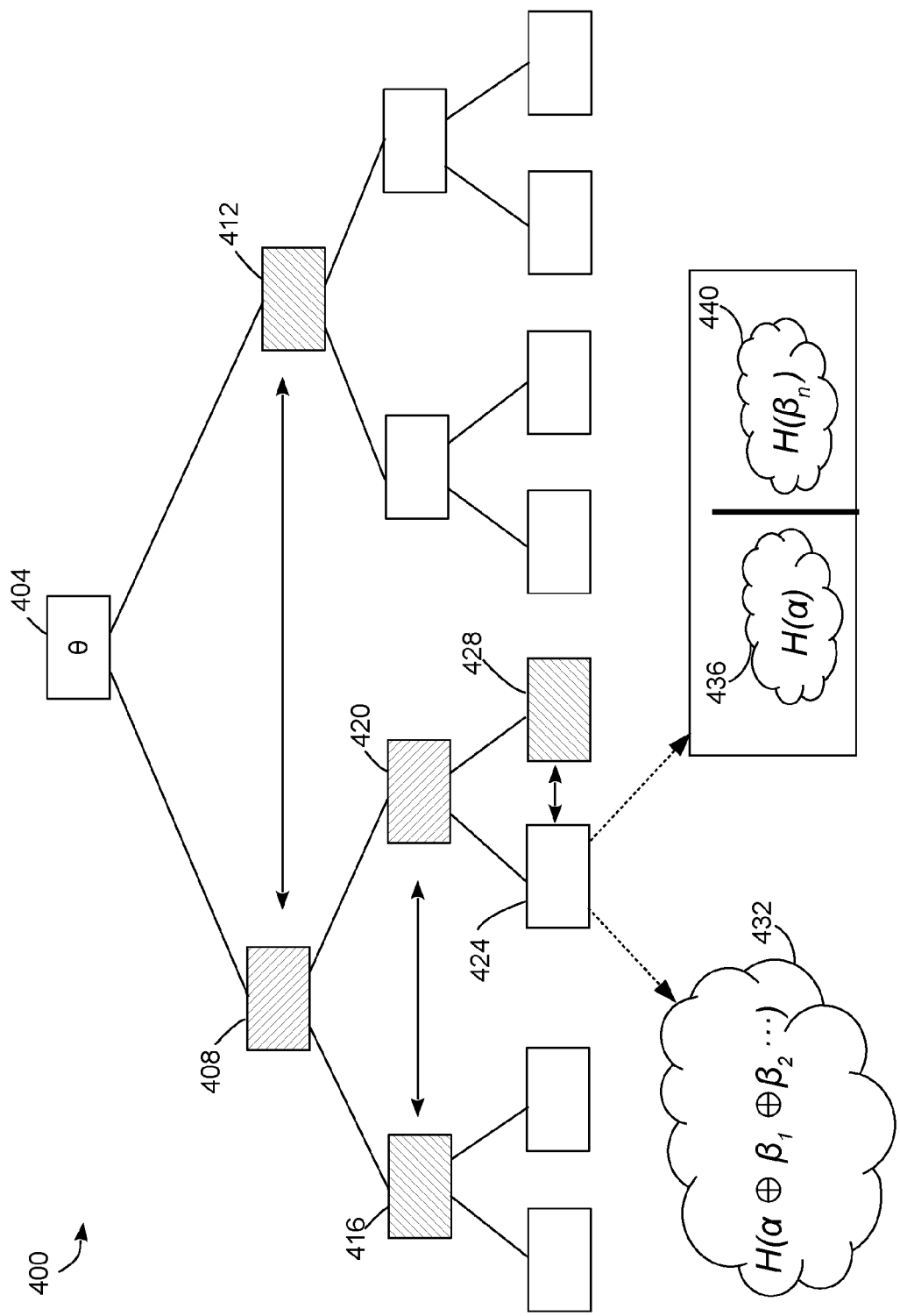
FIG. 4 is an illustrative depiction of a hash tree that is generated by the client computing device of FIG. 1 and stored in a memory device of the server computing device of FIG. 1.

Using the hash tree 400 of FIG. 4 as an example, if the MAC corresponds to the leaf node 424, then the processor 158 in the server 154 identifiers the immediate sibling node 428, and higher level sibling nodes 416 and 412 of the parent nodes in the hash tree hierarchy for the leaf node 424. The processor 158 in the server 154 uses the network interface device 162 to transmit the hash values for these nodes to the client 104 through the data network 140. The processor 108 in the client first regenerates the hash value for the leaf node 428 by applying the cryptographically secure hash function to the MAC value (σ or α) and then regenerates the hash values starting from the leaf node and continuing in a path that leads to the root node as depicted in the nodes 420, 408, and the root node 404 by generating a hash that corresponds to a predetermined combination of the hash values of both nodes at each level of the hash tree. For example, in one embodiment the processor 108 generates the hash for node 420 as: H(node$_{424}$∥node$_{428}$), the hash for node 408 as: H(node$_{416}$∥node$_{420}$) and the regenerated root node hash value: H(node$_{408}$∥node$_{412}$). The regenerated root node hash value that the client 104 produces for a particular hash tree based on the response from the server 154 is also referred to as θ'.

To verify the response from the server 154, the processor 108 compares the previously stored root node hash value θ that is stored with the root node hash data 132 in the memory 120 to the regenerated root node hash value θ'. If the two values match, then the processor 108 identifies that the response from the server 154 is valid (block 224). In the single hash tree embodiment, the validation that the regenerated root node hash θ' matches the stored root node hash θ serves as validation that both the search results returned from the server 154 are accurate and complete and that the encrypted files the client has received from the server 154 are all valid. In the double hash tree embodiment, the initial validation of regenerated root node hash θ' matching the stored root node hash θ serves to validate that the search results retrieved from the server 154 are accurate and complete, but does not directly validate that the server 154 has transmitted valid encrypted data files to the client 104. As described in more detail below, in the double hash tree embodiment the client 104 uses the second hash tree to validate the contents of one or more encrypted files that include the encrypted keyword.

During the process 200, if the regenerated root node hash value does not match the root node hash value data 132 that are stored in the client memory 120 (block 224) then the client 104 generates an output warning message via the output device 112 to indicate that the response from the server 154 is invalid and optionally executes additional software programs to handle a potential security breach of the server 154 (block 248). The client 104 also quarantines or deletes the data received from the server 154 and does not perform normal processing using the data since the difference between the regenerated root node hash and the root node hash data 132 in the memory 120 indicates that at least one of the search data and, in the single hash tree embodiment, the downloaded file data from the server 154 have been altered and are invalid. The client 104 can identify that any portion of the response from the server 154 is invalid based only on the mismatch between the reconstructed root node hash θ' and the stored root node hash θ because any changes to the search index entries or the contents of files also changes the initial hash value for the leaf node that the client 104 reconstructs from the response data that the server 154 transmits to the client 154. Furthermore, since the hash trees use a cryptographically secure hash functions that are immune to preimage and collision attacks, a malicious party who has compromised the server 154 cannot reconstruct a set of hash values for the intermediate nodes in the hash tree that will reproduce the same root hash value θ that is stored in the memory 120 of the client device 104. In embodiments of the system 100 where the client 104 uses the local search index 136, any null result returned from the server 154 indicating that the encrypted keyword is not found in the encrypted search index 174 is immediately identified as being an invalid response.

In the event of successful validation of the search results, the client 104 generates a display of the search results from the server 154 or performs some other predetermined operation using the search results or, in the single hash tree embodiment, decrypted file data that are received as part of the response to the search query from the server 154 (block 228). In some embodiments, the client displays the results of the search to the user and optionally decrypts one or more previously retrieved files that contain the search keyword for display to the user or other processing in the client 104. In the single hash tree embodiment, the processor 108 in the client 104 decrypts one or more of the encrypted files that have been validated in the process 200 using the cryptographic key 128. For the single hash tree embodiment, the process 200 successfully concludes after the validation of the search results and encrypted file data and subsequent output of the search results and optional decryption of one or more of the retrieved encrypted files.

In the double hash tree embodiment, the process 200 optionally continues for situations in which the client 104 also retrieves and decrypts an encrypted file that is identified in the validated results of the search query. In the system 100, the processor 108 and the network interface device 116 in the client 104 transmit a request to retrieve at least one of the encrypted files that are identified in the results of the search query and the client 104 receives the encrypted files and hash data from the second hash tree from the server 154 through the network 140 (block 232). In the server 154, the processor 158 receives the request via the network interface device 162 and transmits the encrypted file data 178 that correspond to the encrypted file identifier received from the client 104. For each file request, the processor 158 also identifies the leaf node in the second hash tree that corresponds to the hash value of the MAC for the file itself, such as $H(\beta_n)$ data 440 that is depicted in conjunction with the leaf node 424 of FIG. 4. The processor 158 in the server 154 identifies the hash values and transmits the hash values for the sibling nodes and parent nodes from the second hash tree to the client 104 in a similar manner to the transmission of the hash tree data from the first hash tree for validation of the search results that is described above.

The process 200 continues as the client 104 regenerates the root node of the second hash tree based on the encrypted file identifier of the retrieved file, the contents of the encrypted file data 178, and the hash values that correspond to the nodes in the second hash tree data 182 stored in the memory 170 (block 236). As described above, the processor 108 in the client 104 reproduces the MAC $\beta_n = MAC(\overline{F_n}\|\overline{c_n})$ for the requested file with the encrypted identifier $\overline{F_n}$ and encrypted contents $\overline{c_n}$ using the MAC key $K_m$. The processor 108 then generates the hash value corresponding to the leaf node in the second hash tree using the cryptographically secure hash function $H(\beta_n)$ and reproduces the hashes for the intermediate levels and root node of the second hash tree in a similar manner to the processing that is described above with regards to block 220.

During the process 200, if the regenerated root node hash $\theta'$ for the second hash tree matches the stored root node hash $\theta$ in the root node hash data 132 for the second hash tree (block 240) then the processor 108 in the client 104 uses the cryptographic key 128 to decrypt the encrypted file that includes the keyword from the search and the client 104 generates an output with the output device 112 based on the plaintext contents of the file (block 244). If, however, the regenerated hash for the root node of the second hash tree does not match the stored hash value data 132 for the second hash tree stored in the memory 120 (block 240), then the processor 108 generate an output warning with the output device 112 and optionally takes other measures in response to identification that the regenerated root node hash $\theta'$ does not match the stored root node hash $\theta$ (block 248). In most situations, the client 104 does not decrypt or otherwise process the encrypted data that is received from the server 154 unless the client 104 executes a specific security program in the stored program data 124 to analyze the invalid file data that are received from the server 154.

As described above, during the verification process for the response data from the server 154, the client 104 uses the encrypted file identifiers $(\overline{F_n})$ and optionally the encrypted file data $(\overline{c_n})$ in addition to the encrypted keyword to generate the MAC for the leaf node of the hash tree. Of course, those of skill in the art will recognize that the plaintext file identifiers and file content data along with the plaintext keyword could be used to generate a different MAC while still being compatible with the process 200 and without leaking information to the server 154 since the server 154 cannot use the MAC value of any data, encrypted or plaintext, to recover the original input data to the MAC function. However, one advantage to using the encrypted file data that the client 104 receives directly from the server is that the client 104 validates the file data prior to decrypting the encrypted files and, if the server is not returning valid search results or valid files, the client 104 identifies the inaccurate results from the server prior to having to perform the decryption process.

Figure 3:
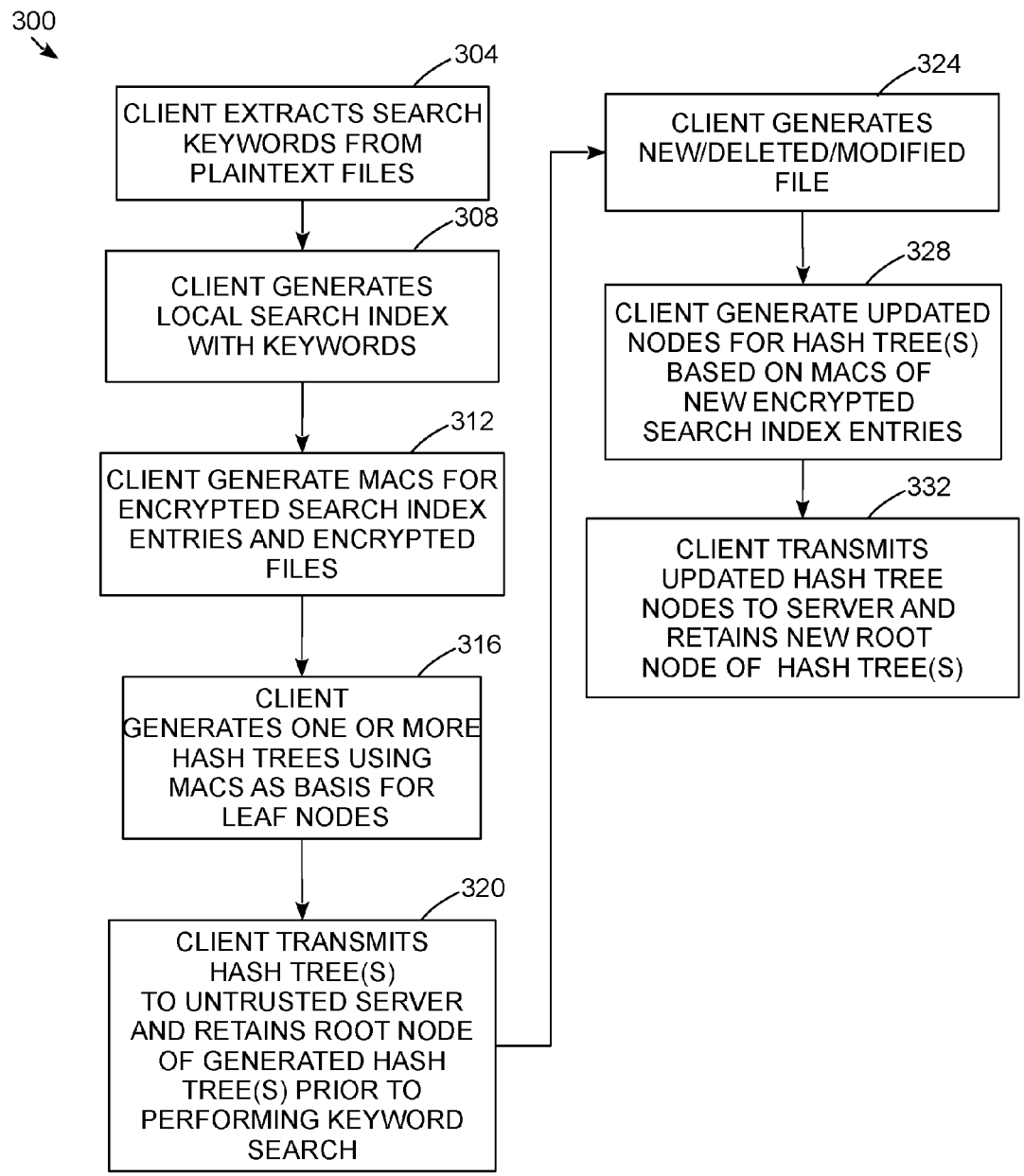
FIG. 3 is a block diagram of another process for generating hash trees that are used in the system of FIG. 1 and the process of FIG. 2.

FIG. 3 depicts a process 300 for generating and updating the local search index and the hash trees that are described above in conjunction with the system 100 and the process 200. The process 300 is described in addition to the generation of the encrypted file data and the encrypted search index structure that is otherwise known to the art in symmetric searchable encryption schemes. In the description below, a reference to the process 300 performing an action or function refers to the operation of a processor to execute stored program instructions to implement the action or function in association with other components in a computerized device or network. The process 300 is described in conjunction with the system 100 of FIG. 1 for illustrative purposes.

Process 300 begins as the client generates extracts search keywords from a plurality of plaintext files to generate a search index that maps keywords to files that include the keywords (block 304). To identify the keywords for the local search index and the full search, the processor 108 in the client 104 processes plaintext data files to identify keywords in the data files that are subject to future searches through encrypted versions of the same data files using, for example, parsing and lexing software programs that are otherwise known to the art.

During the process 300, the client 104 optionally generates the local search index 136 that enables the client 104 to identify if a search keyword should be present in at least one encrypted file that is stored on the server 154 prior to generating an transmitting the search request (block 308). The processor 108 in the client 104 generates the local search index 136 using, for example, a hash table or binary search tree that includes an entry for each unique keyword that the client 104 uses in the search index that is eventually encrypted and transmitted to the server 154. As described above, the local search index 136 only needs to encode the presence of keywords that are included in at least one file and the processor 108 does not need to include the identifiers for any specific files that contain a keyword, which enables the client 104 to generate the local search index 136 and store the local search index 136 using a comparatively small amount of available space in the memory storage device or devices of the memory 120.

The process 300 continues as the processor 108 in the client 104 uses the MAC cryptographic key 130 to generate the MAC values for both the encrypted search index entries and the encrypted files that are associated with encrypted file identifiers in the search index (block 312). As described above, the MAC for each search index entry is associated with the encrypted keyword $(\overline{Keyword})$ and each of the encrypted file identifiers for the files that include the keyword $(\overline{F_1} \ldots \overline{F_N})$ for at least one encrypted file identifier that includes the keyword. The processor 108 generates the search index MAC $\alpha$ entry for each of the keywords: $\alpha = MAC(\overline{Keyword}\|\overline{F_1}\|\overline{F_2}\| \ldots \|\overline{F_N})$. Additionally, the processor 108 generates the MAC value for each encrypted file $\beta_n = MAC(\overline{F_n}\|\overline{c_n})$ using both the encrypted identifier for the file $\overline{F_n}$ and the encrypted contents of the file $\overline{c_n}$ as inputs.

The process 300 continues as the processor 108 in the client 104 generates a single hash tree or two hash trees based on the search index MAC values $\alpha$ and the encrypted file MAC values $\beta$ (block 316). In the single hash tree embodiment, the processor 108 generates an aggregate MAC as an exclusive-or (XOR) combination of the individual search entry and file MACs $\sigma = \alpha \oplus \beta_1 \oplus \beta_2 \ldots \oplus \beta_N$ for each of the keyword entries a and the corresponding MACs of the files that match each keyword entry. The processor 108 generates the hash tree by first applying the cryptographically secure hash function to the aggregate MAC σ for each keyword to produce a plurality of hash values that form leaves in the hash tree. The processor 108 arranges the leaves in an arbitrary order, such as a randomized order or in an ascending/descending order based on the MAC value (not the underlying value of the search keywords) to ensure that the structure of the hash tree does not divulge information about the original keywords prior to encryption. In a Merkle tree embodiment, such as the Merkle hash tree 400 of FIG. 4, the processor 108 selects the hash values for pairs of leaf nodes and performs the cryptographically secure hash function on a combination of the hash values for the pair of leaf nodes to generate the next higher layer of nodes in the tree, where each successive layer of nodes typically includes half the number of nodes for the previous layer in a binary tree structure. The processor 108 continues applying the cryptographically secure hash function to pairs of hash values until generating the hash value for a single root node θ. The value of the hash for the root node hash θ depends upon every node in the tree down to each of the leaf nodes, which enables the client 104 to identify if the server 154 has altered any encrypted search index entry or any encrypted file in the response from the server 154 during the process 200.

In the double hash tree embodiment, the client 104 performs the same hash tree generation process as is described above for the single hash tree embodiment, but the processor 108 uses the MAC values α as the basis for leaf nodes in the first hash tree that validates the responses from the server 154 regarding entries in the encrypted search index 174 and the processor 108 uses the separate MAC values β as the basis for the leaf nodes in the second hash tree that the processor 108 uses to validate individual files that are received from the server 154. In most configurations the double hash trees have a different number of leaf nodes since the size of the first hash tree depends upon the number of keywords that are present in the encrypted search index and the second hash tree includes a leaf node for each file in the plurality of encrypted files 178. Thus, the leaf nodes in the double hash trees do not have any particular relationship to each other.

The process 300 continues as the client 104 transmits the hash tree data, for either one or double hash trees, to the server 154 and the client 104 retains the hash data for the root nodes for either the single hash tree or both hash trees in client memory 120 (block 320). In the client 104, the processor 108 uses the network interface device 116 to transmit the hash tree data to the server 154 via the data network 140. The server processor 158 receives the hash tree data via the network interface device 162 and stores the hash tree data for either single hash tree or double hash trees with the full hash tree data 182 in the server memory 170. The client 104 also transmits the encrypted search index data 174 and the encrypted file data 178 to the server 154 as part of a symmetric searchable encryption process that is not described in further detail herein. After the processing that is described in conjunction with block 320 in the process 300, the client 104 and the server 154 can perform the process 200 to enable the client 104 to perform searches for encrypted keywords and to verify the correctness and completeness of the search result data and encrypted file data that the client 154 receives from the server 154.

In some situations the client 104 generates a new file or modifies an existing file (including deletion of the file) in a manner that affects the search index and the encrypted file data (block 324). During process 300, the client 104 also generates updates to the single or double hash trees to reflect the changes that have been made to the encrypted search index and file data (block 328). To generate the updates for the hash tree, the client 104 first retrieves the hash values for nodes in the existing hash tree starting from the leaf node of any entry that has changed due to the changes to the file data and the client 104 regenerates hash values starting from a newly generate MAC value at the leaf node and extending up to the root node of the tree.

Using the hash tree 400 of FIG. 4 as an example, the processor 108 generates an updated MAC value associated with the file modification for the leaf node 424 as a new aggregate MAC value 432 (single hash tree embodiment) or either of a search entry MAC value 436 in a first hash tree or file identifier MAC 440 in a second hash tree (double hash tree embodiment). The client 104 retrieves the hash values for the neighboring nodes 428, 416, and 412 to enable the processor 108 to generate the revised hash values for the intermediate nodes 420, 408, and the root node 404. However, the client 104 does not need to modify the hash values for the other leaf nodes beyond the leaf nodes 424 and 428 or other higher layer nodes that do not form part of a node pair within the hash tree 400, which enables the client 104 to modify the hash tree without having to completely regenerate a new hash tree for many file modifications. In the event that the file modification results in the addition of a new leaf node or removal of a leaf node from the hash tree, the processor 108 in the client 104 requests the hash tree nodes from the server 154 to enable the client 104 to rebalance the hash tree and in some embodiments the client 104 regenerates a new hash tree if the number of leaf nodes changes as opposed to modifying the hash value of a leaf node that is already part of the hash tree. The client 104 modifies the single hash tree or double hash trees to properly reflect the structure of the modified files and search index data in addition to updating the encrypted search index 174 and the encrypted file data 178 using techniques that are otherwise known to the art for symmetric searchable encryption schemes.

After generating the modifications to the hash tree, the client 104 transmits the updated hash tree data to the server 154 and the client 104 retains the modified root node value for either the single hash tree or both of the hash trees with the hash tree root node data 132 in the memory 120 (block 332). The processor 108 in the client 104 uses the network interface device 116 to transmit the updated hash values for any modified leaf nodes, intermediate nodes, and the modified root node data to the server 154 via the data network 140. The processor 158 in the server 154 receives the modified hash tree data via the network interface device 162 and modifies the appropriate nodes in the stored full hash tree data 182. The modified hash tree enables the server 154 to provide the hash values that are required to validate the search results from the server during subsequent executions of the process 200 in which the client 104 performs search queries that retrieve modified search data from the encrypted search data index 174 and modified encrypted files from the encrypted file data 178. The modifications to the hash trees also prevent an attacker who compromises the server 154 from performing a replay attack where the attacker returns an out of date version of a particular encrypted search index entry or encrypted data file to the client instead of returning the most up to date version. Since the process 300 modifies the root node of the single hash tree or both hash trees, the client 104 no longer considers old versions of the search index data and encrypted file data as being valid after modifying the data during the process 300.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed herein in the following claims.

What is claimed:

1. A method verification of search results in an encrypted search process comprising:
   generating, with a client computing device, an encrypted keyword based on a plaintext keyword using a first cryptographic key stored in a memory of the client computing device;
   transmitting, with the client computing device, a search query including the encrypted keyword to a server computing device through a data network;
   receiving, with the client computing device, a response to the search query and a first plurality of hash values from at least one hash tree from the server computing device through the data network, the first plurality of hash values corresponding to a plurality of nodes in the at least one hash tree corresponding to siblings of nodes in a path from a leaf node corresponding to the response to the query to a root node of the at least one hash tree;
   generating, with the client computing device, a first message authentication code (MAC) based on the response to the search query using a second cryptographic key stored in the memory of the client computing device;
   generating, with the client computing device, a first regenerated root node hash value using the first MAC, the first plurality of hash values, and a predetermined hash function;
   decrypting, with the client computing device, an encrypted file identifier included in the response to the search query to generate a plaintext file identifier using the first cryptographic key stored in the memory of the client computing device only in response to the root node hash value matching the predetermined first root node hash value stored in the memory of the client computing device;
   generating, with an output device in the client computing device, a first output message including the plaintext file identifier only in response to the root node hash value matching the predetermined first root node hash value stored in the memory of the client computing device;
   and
   generating, with the output device in the client computing device, a second output message indicating that the response from the server computing device is invalid in response to the first regenerated root node hash value not matching a predetermined first root node hash value stored in the memory of the client computing device.

2. The method of claim 1 further comprising:
   decrypting, with the client computing device, an encrypted file included in the response to the search query to generate a plaintext file using the first cryptographic key stored in the memory of the client computing device only in response to the root node hash value matching the predetermined first root node hash value stored in the memory of the client computing device; and
   generating, with the output device in the client computing device, the first output message including at least a portion of the plaintext file only in response to the root node hash value matching the predetermined first root node hash value stored in the memory of the client computing device.

3. The method of claim 1 further comprising:
   receiving, with the client computing device, the response to the search query including an entry of an encrypted search index stored in the memory of the server computing device corresponding to the encrypted keyword in the search query and a first encrypted file that is identified in the entry of the encrypted search index;
   generating, with the client computing device, a second MAC based on the encrypted keyword and an encrypted file identifier for the first encrypted file included in the entry of the encrypted search index using the second cryptographic key stored in the memory of the client computing device;
   generating, with the client computing device, a third MAC, based on the encrypted file identifier for the first encrypted file and contents of the first encrypted file using the second cryptographic key stored in the memory of the client computing device; and
   generating, with the client computing device, the first MAC based on a combination of the second MAC and the third MAC.

4. The method of claim 3, the generation of the first MAC further comprising:
   generating, with the client computing device, the first MAC as an exclusive-or combination of the second MAC and the third MAC.

5. The method of claim 3 further comprising:
   decrypting, with the client computing device, the entry in the encrypted search index received from the server computing device to generate a plaintext search entry using the first cryptographic key stored in the memory of the client computing device;
   transmitting, with the client computing device, a request for the first encrypted file to the server computing device through the data network; and
   receiving, with the client computing device, the first encrypted file from the server computing device through the data network prior to generating the third MAC.

6. The method of claim 3 further comprising:
   receiving, with the client computing device, the first plurality of hash values from a single hash tree stored in the memory of the server computing device; and
   generating, with the client computing device, the first regenerated root node hash value to verify the entry in the encrypted search index and the first encrypted file received from the server computing device.

7. The method of claim 1 further comprising:
   receiving, with the client computing device, the response to the search query including an entry of an encrypted search index corresponding to the encrypted keyword in the search query and the first plurality of hash values from a first hash tree stored in the memory of the server computing device;
   generating, with the client computing device, the first MAC based on the encrypted keyword and an encrypted file identifier for a first encrypted file included in the entry of the encrypted search index using the second cryptographic key stored in the memory of the client computing device; and generating, with the client computing device, the first regenerated root node hash value using the first MAC, the first plurality of hash values, and a predetermined hash function to perform validation of only the entry of the encrypted search index.

8. The method of claim 7 further comprising:

transmitting, with the client computing device, a request for the first encrypted file to the server computing device through the data network only in response to the root node hash value matching the predetermined first root node hash value stored in the memory of the client computing device;

receiving, with the client computing device, the first encrypted file and a second plurality of hash values from a second hash tree stored in the memory of the server computing device through the data network;

generating, with the client computing device, a second MAC, based on the encrypted file identifier for the first encrypted file and contents of the first encrypted file using the second cryptographic key stored in the memory of the client computing device;

generating, with the client computing device, a second regenerated root node hash value using the second MAC, the second plurality of hash values, and the predetermined hash function; and generating, with the output device in the client computing device, the second output message indicating that the response from the server computing device is invalid in response to the second regenerated root node hash value not matching a predetermined second root node hash value stored in the memory of the client computing device.

9. The method of claim 1 wherein the client computing device uses a single cryptographic key stored in the memory of the client computing device as the first cryptographic key and the second cryptographic key.

10. A client computing device configured to perform verification of encrypted search responses comprising:

a network interface device configured to send and receive data through a data network;

a memory;

an output device; and a processor operatively connected to the network interface device, the memory, and the output device, the processor being configured to:

generate an encrypted keyword based on a plaintext keyword using a first cryptographic key stored in the memory;

transmit a search query including the encrypted keyword to a server computing device through a data network using the network interface device;

receive a response to the search query and a first plurality of hash values from at least one hash tree from the server computing device using the network interface device, the first plurality of hash values corresponding to a plurality of nodes in the at least one hash tree corresponding to siblings of nodes in a path from a leaf node corresponding to the response to the query to a root node of the at least one hash tree;

generate a first message authentication code (MAC) based on the response to the search query using a second cryptographic key stored in the memory;

generate a first regenerated root node hash value using the first MAC, the first plurality of hash values, and a predetermined hash function;

decrypt an encrypted file identifier included in the response to the search query to generate a plaintext file identifier using the first cryptographic key stored in the memory of the client computing device only in response to the root node hash value matching the predetermined first root node hash value stored in the memory of the client computing device;

generate a first output message with the output device including the plaintext file identifier only in response to the root node hash value matching the predetermined first root node hash value stored in the memory of the client computing device; and generate a second output message with the output device indicating that the response from the server computing device is invalid in response to the first regenerated root node hash value not matching a predetermined first root node hash value stored in the memory of the client computing device.

11. The client computing device of claim 10, the processor being further configured to:

decrypt an encrypted file included in the response to the search query to generate a plaintext file using the first cryptographic key stored in the memory of the client computing device only in response to the root node hash value matching the predetermined first root node hash value stored in the memory of the client computing device; and generate the first output message with the output device including at least a portion of the plaintext file only in response to the root node hash value matching the predetermined first root node hash value stored in the memory of the client computing device.

12. The client computing device of claim 10, the processor being further configured to:

receive the response to the search query including an entry of an encrypted search index stored in the memory of the server computing device corresponding to the encrypted keyword in the search query and a first encrypted file that is identified in the entry of the encrypted search index;

generate a second MAC based on the encrypted keyword and an encrypted file identifier for the first encrypted file included in the entry of the encrypted search index using the second cryptographic key stored in the memory of the client computing device;

generate a third MAC, based on the encrypted file identifier for the first encrypted file and contents of the first encrypted file using the second cryptographic key stored in the memory of the client computing device; and generate the first MAC based on a combination of the second MAC and the third MAC.

13. The client computing device of claim 12, the processor being further configured to:

generate the first MAC as an exclusive-or combination of the second MAC and the third MAC.

14. The client computing device of claim 12, the processor being further configured to:

decrypt the entry in the encrypted search index received from the server computing device to generate a plaintext search entry using the first cryptographic key stored in the memory;

transmit a request for the first encrypted file to the server computing device through the data network using the network interface device; and receive the first encrypted file from the server computing device through the data network using the network interface device prior to generating the third MAC.

15. The client computing device of claim 12, the processor being further configured to:
receive the first plurality of hash values from a single hash tree stored in the memory of the server computing device; and generate the first regenerated root node hash value to verify the entry in the encrypted search index and the first encrypted file received from the server computing device.

16. The client computing device of claim 10, the processor being further configured to:
receive the response to the search query including an entry of an encrypted search index corresponding to the encrypted keyword in the search query and the first plurality of hash values from a first hash tree stored in the memory of the server computing device;
generate the first MAC based on the encrypted keyword and an encrypted file identifier for a first encrypted file included in the entry of the encrypted search index using the second cryptographic key stored in the memory of the client computing device; and
generate the first regenerated root node hash value using the first MAC, the first plurality of hash values, and a predetermined hash function to perform validation of only the entry of the encrypted search index.

17. The client computing device of claim 16, the processor being further configured to:
transmit a request for the first encrypted file to the server computing device through the data network using the network interface device only in response to the root node hash value matching the predetermined first root node hash value stored in the memory of the client computing device;
receive, the first encrypted file and a second plurality of hash values from a second hash tree stored in the memory of the server computing device through the data network using the network interface device;
generate a second MAC, based on the encrypted file identifier for the first encrypted file and contents of the first encrypted file using the second cryptographic key stored in the memory of the client computing device;
generate a second regenerated root node hash value using the second MAC, the second plurality of hash values, and the predetermined hash function; and
generate the second output message with the output device indicating that the response from the server computing device is invalid in response to the second regenerated root node hash value not matching a predetermined second root node hash value stored in the memory of the client computing device.

18. The client computing device of claim 10, the memory being further configured to store a single cryptographic key as the first cryptographic key and the second cryptographic key.

* * * * *